US008234201B1

(12) United States Patent  (10) Patent No.: US 8,234,201 B1
Canabarro  (45) Date of Patent: Jul. 31, 2012

(54) SYSTEM AND METHOD FOR DETERMINING A LIQUIDITY-ADJUSTED VALUE AT RISK (LA-VAR)

(75) Inventor: Eduardo Canabarro, Westfield, NJ (US)

(73) Assignee: Morgan Stanley, New York, NY (US)

( * ) Notice: Subject to any disclaimer, the term of this patent is extended or adjusted under 35 U.S.C. 154(b) by 547 days.

(21) Appl. No.: 12/408,240

(22) Filed: Mar. 20, 2009

Related U.S. Application Data

(60) Provisional application No. 61/085,610, filed on Aug. 1, 2008.

(51) Int. Cl.
  *G06Q 40/00* (2012.01)
(52) U.S. Cl. ..................................................... 705/36 R
(58) Field of Classification Search ................ 705/36 R, 705/35
  See application file for complete search history.

(56) References Cited

U.S. PATENT DOCUMENTS

| | | | |
|---|---|---|---|
| 5,819,237 A | 10/1998 | Garman | |
| 6,085,175 A | 7/2000 | Gugel et al. | |
| 7,356,504 B2 | 4/2008 | Müller | |
| 2002/0019803 A1 | 2/2002 | Muller | |
| 2003/0061152 A1* | 3/2003 | De et al. | 705/38 |
| 2003/0139993 A1* | 7/2003 | Feuerverger | 705/36 |
| 2003/0172017 A1 | 9/2003 | Feingold et al. | |
| 2008/0177673 A1 | 7/2008 | Anh et al. | |

FOREIGN PATENT DOCUMENTS

| | | |
|---|---|---|
| WO | WO 01/77911 A2 | 10/2001 |
| WO | WO 2008/157832 A1 | 12/2008 |

OTHER PUBLICATIONS

Bangia et al. "Modeling Liquidity Risk With Implications for Traditional Market Risk Measurement and Management". Dec. 21, 1998. pp. 1-16.*
Angelidis and Benos. "Liquidity Adjusted Value-at-Risk based on the components of the Bid-Ask Spread." Jan. 14, 2005.*
Fallon, William. "Calculating Value-at-Risk". The Wharton School, University of Pennsylvania, Financial Institutions Center. Jan. 22, 1996.*
Bangia et al., "Modeling Liquidity Risk With Implications for Traditional Market Risk Measurement and Management," Dec. 21, 1998, pp. 1-16.
Wilson, Thomas C., "Portfolio Credit Risk," *FRBNY Economic Policy Review*, Oct. 1998, pp. 71-82.
Angelidis and Benos, "Liquidity Adjusted Value-at-Risk Based on the Components of the Bid-Ask Spread," Jan. 14, 2005 (20 pages).
Crouhy et al., "A Comparative Analysis of Current Credit Risk Models," *Journal of Banking and Finance*, 24 (2000), pp. 59-117.
Fallon, William, "Calculating Value-at-Risk," The Wharton School, University of Pennsylvania, Financial Institutions Center, Jan. 22, 1996 (39 pages).
Simons, Katerina, "Value at Risk—New Approaches to Risk Management," *New England Economic Review*, Sep./Oct. 1996 (14 pages).
Glasserman, Paul, "Applications in Risk Management," *Monte Carlo Methods in Financial Engineering*, 2004, pp. 481-492 (16 pages).
Hull, John C., "Value at Risk," *Options, Futures, and Other Derivatives*, 6th Edition, 2006, pp. 435-459 (27 pages).

* cited by examiner

*Primary Examiner* — Hani M Kazimi
*Assistant Examiner* — John Preston
(74) *Attorney, Agent, or Firm* — K&L Gates LLP

(57) ABSTRACT

Computer-based systems and methods for calculating a liquidity-adjusted VaR for a portfolio. The liquidity-adjusted VaR accounts for the different liquidities of the risks. The process for calculating the liquidity-adjusted VaR may include adding to the standard 1-day VaR only the losses produced by illiquid risks that are orthogonal to the space of liquid risks.

27 Claims, 5 Drawing Sheets

SYSTEM AND METHOD FOR DETERMINING A LIQUIDITY-ADJUSTED VALUE AT RISK (LA-VAR)

PRIORITY CLAIM

The present application claims priority to U.S. provisional patent application Ser. No. 61/085,610, filed Aug. 1, 2008, which is incorporated herein by reference in its entirety.

BACKGROUND

In economics and finance, Value at Risk (VaR) for a financial portfolio is a measure of the portfolio's maximum loss not exceeded with a given probability, defined as the confidence level, over a given period of time. VaR is commonly used by financial institutions to measure the market risk of their asset portfolios. VaR may be thought of in the following form: "We are X percent certain that we will not lose more than V dollars in the next N days," where V is the VaR of the portfolio (expressed in dollars in this example), N is the time horizon, and X is the confidence level. In practice, time horizons (N) of one (1), five (5), ten (10), and twenty (20) days are used, and confidence levels of 99% or 95% are used. Thus, in general, when N days is the time horizon and X % is the confidence level, VaR is the loss corresponding to the (100-X)th percentile of the probability distribution of the change in the value of the portfolio over the next N days.

There are many known ways to compute VaR, including historical simulation and Monte Carlo simulation. Most VaR-calculation methodologies, however, do not explicitly model the different liquidities of the of the market risks involved. As a result, the prior art tends to overweight liquid factors for VaR time horizons greater than one day. Thus, methodologies for determining VaR that are more objective and that appropriately consider the liquidity of market risks are needed.

SUMMARY

In one general aspect, the present invention is directed to computer-based systems and methods for calculating a liquidity-adjusted value-at-risk ("LA-VaR) for a portfolio. The liquidity-adjusted VaR accounts for the different liquidities of the risks included in the VaR calculation. According to various embodiments, the process for calculating the liquidity-adjusted VaR includes adding to the standard 1-day VaR only the losses produced by illiquid risks that are orthogonal to (i.e., unhedgeable by) the risks that have 1-day liquidity.

FIGURES

Various embodiments of the present invention are described herein by way of example in conjunction with the following figures, wherein.

Figure 5:
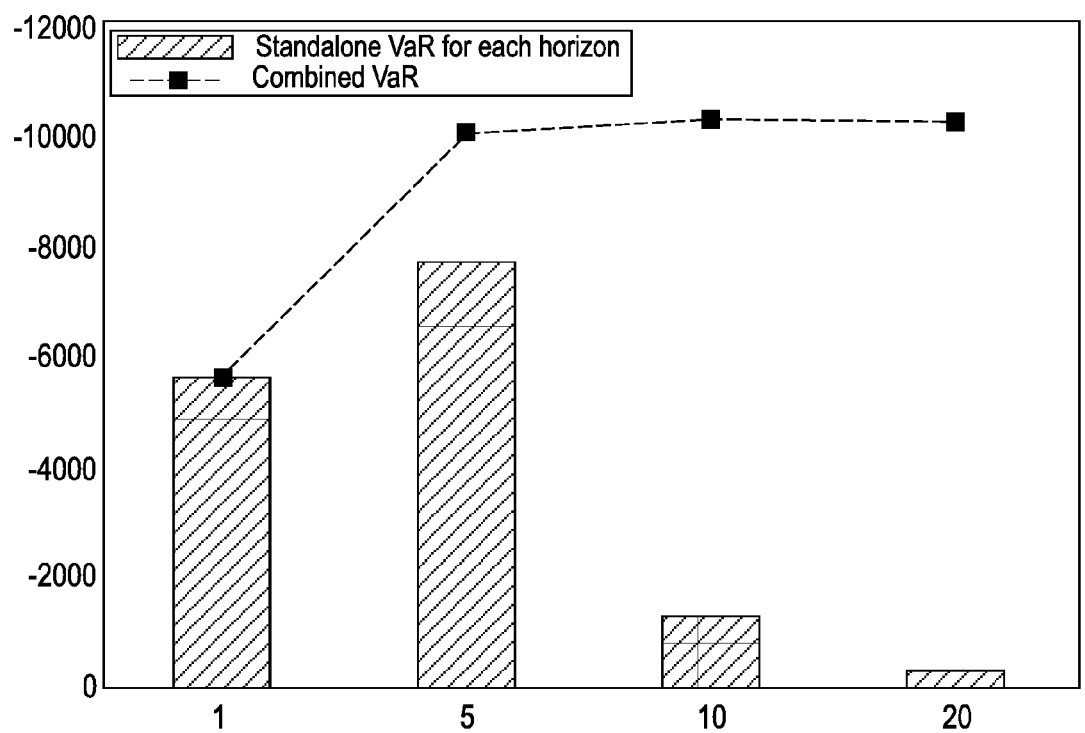

FIG. 5 graphically presents results from a sample VaR calculation according to various embodiments of the present invention.

DESCRIPTION

Figure 1:
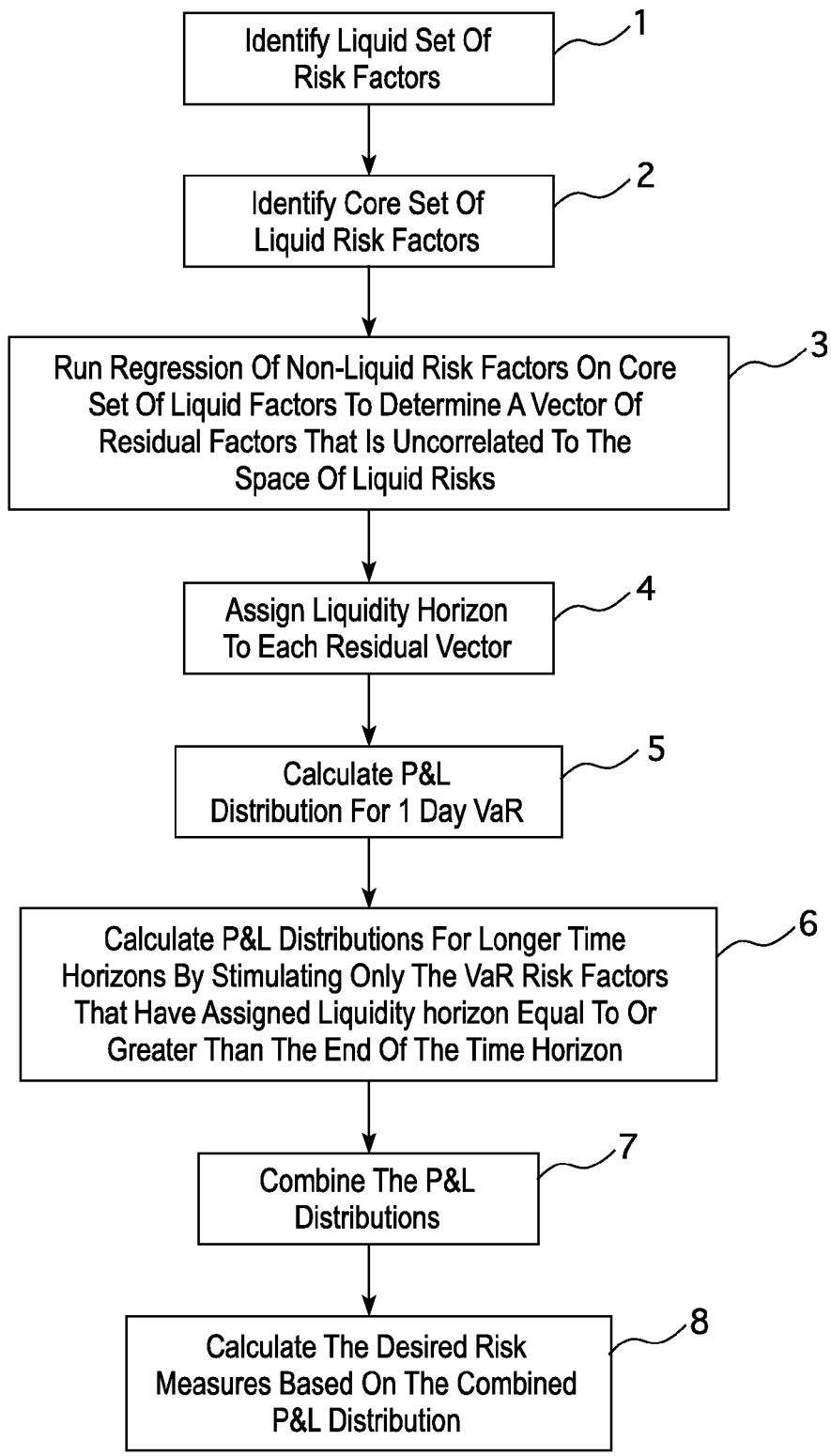
FIG. 1 is a diagram of a process for calculating a liquidity-adjusted VaR according to various embodiments of the present invention.
Figure 2:
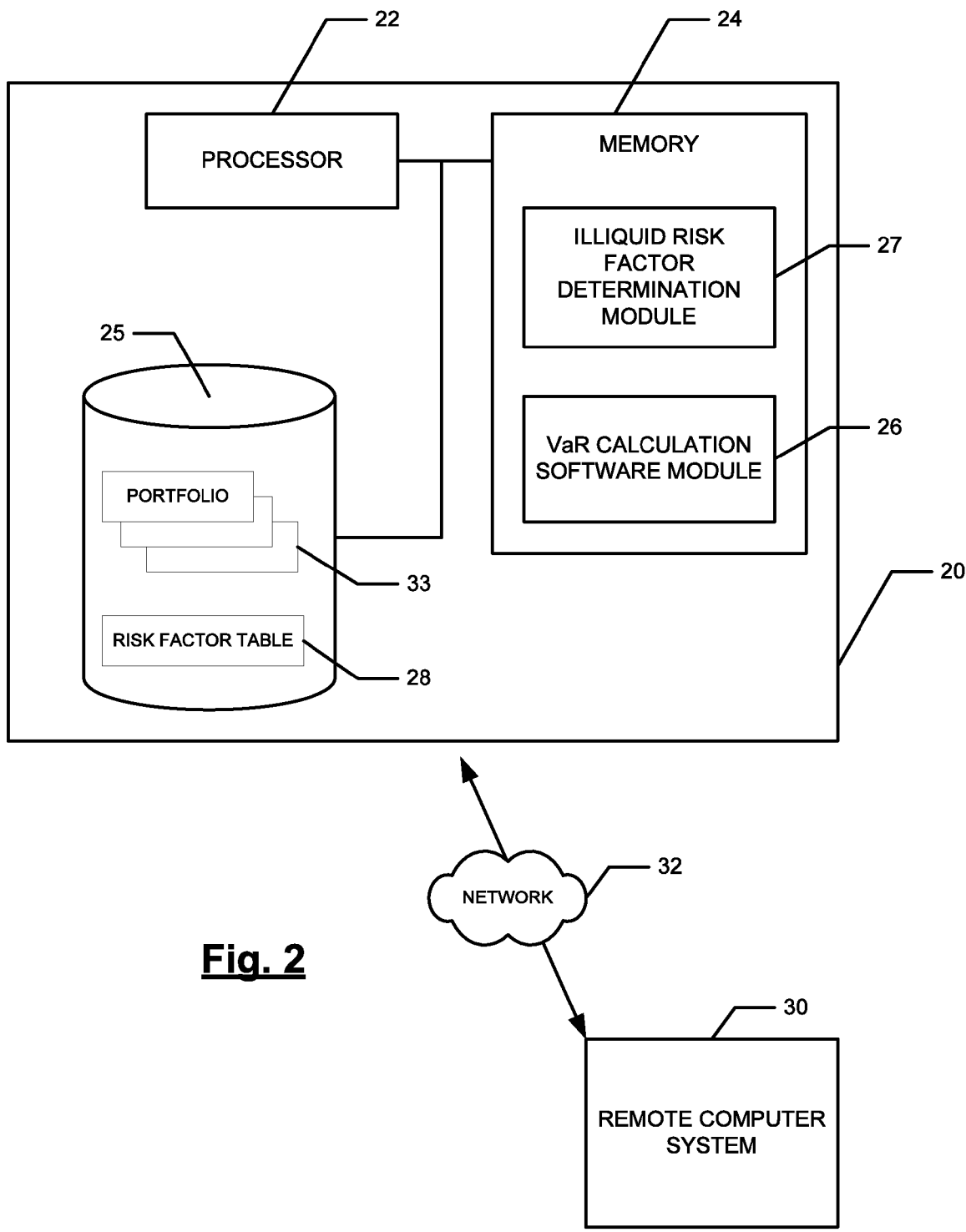
FIG. 2 is a diagram of a computer system according to various embodiments of the present invention

In one general aspect, the present invention is directed to computer-based systems and methods for calculating a liquidity-adjusted value-at-risk (LA-VaR) for a portfolio. The liquidity-adjusted VaR accounts for the different liquidities of the risks included in the VaR calculation. A financial institution or other entity may use the process to calculate the VaR for its portfolios or the portfolios of others. FIG. 1 is a diagram of the process for calculating the LA-VaR and FIG. 2 is a diagram of a computer system 20 that may be used to calculate the LA-VaR according to various embodiments of the present invention. Before describing the process in detail, a brief description of the exemplary computer system 20 is provided.

The computer system 20 may be implemented as one or a number of networked electronic computing devices, such as desktop computers, laptop computers, servers, mainframes, workstations, etc. If a number of network computing devices are used, the computer devices may be interconnected by a computer network, such as a LAN or WAN, or any other suitable computer data network. As shown in FIG. 2, the computer system 20 may comprise one or more processors 22 and one or more computer memories 24. For convenience, only one processor 22 and only one memory 24 are shown in FIG. 2. The processor 22 may be implemented as an integrated circuit (IC) and may have one or multiple cores. The memory 24 may comprise volatile and/or non-volatile memory units. Volatile memory units may comprise random access memory (RAM), for example. Non-volatile memory units may comprise read only memory (ROM), for example, as well as mechanical non-volatile memory systems, such as, for example, a hard disk drive, an optical disk drive, etc. The RAM and/or ROM memory units may be implemented as discrete memory ICs, for example.

The computer system 20 also comprises a computer database 25 that stores relevant data for calculating the LA-VaR, such as data regarding the portfolio that is the subject of the LA-VaR calculation and the risk factors, as described further below. The data of the database 25 may be stored in a non-volatile memory unit(s) of the computer system 20, such as a hard disk drive, a ROM IC, or other type of non-volatile memory. Also, the data of the database 25 may be stored on a remote computer server that is connected to the computer device system 20 via a computer network. In addition, although only one database 25 is shown in FIG. 2, the computer system 20 may comprise a number of different databases to store the relevant data.

The memory 24, such as a non-volatile memory unit, may comprise a VaR calculation software module 26 and an illiquid risk factor determination module 27. The illiquid risk factor determination module 27 may comprise computer software instructions that when executed by the processor 22, cause the processor 22 to identify a core set of liquid risk factors and illiquid risk factors, as described in more detail below. The VaR calculation software module 26 may comprise computer software instructions that, when executed by the processor 22, cause the processor 22 to calculate the LA-VaR according to the processes described below. The computer system 20 may store the calculated LA-VaR measures in a store or memory associated with the computer system 20. For example, the computer system 20 may store the calculated LA-VaR for the portfolio in a volatile and/or non-volatile memory unit or database of the computer system 20. In addition, the computer system 20 may transmit the calculated LA-VaR measure(s), such as in a file, to another computer system 30 via a computer data network 32, such as a LAN or WAN.

Referring now to the exemplary process illustrated in FIG. 1, at step 1, a liquid set of risk factors is identified. That is, for example, a universal or comprehensive list of market risk factors is identified, and from that universal or comprehensive list, the liquid market risk factors are identified. Risk factors may include observable financial market variables such as interest rates, stock prices, index values, foreign exchange rates, bond yields, swaption prices, etc. The universal risk factors may be identified by polling or asking risk managers and/or traders at the firm or other financial institution about risk factors that affect their portfolios, for example. The risk managers and/or traders may also assign a liquidity time horizon to each risk factor (e.g., 1 day, 5 days, 10 days, 20 days, etc.). The liquidity time horizon for each risk factor may be indicative of how long it would take to hedge the risk factor under regular or stressed market conditions. Risk factors that can be hedged quickly would have short liquidity time horizons and risk factors that cannot be hedged quickly would have longer liquidity time horizons. Risk factors having short liquidity time horizons may be considered "liquid factors." For example, risk factors having a 1-day risk horizon may be considered the liquid risk factors. In that way, from the universal set of risk factors, the liquid set of risk factors may be identified. The risk factors and their associated liquidity time horizons may be stored in a table 28 in the database 25.

Because the quantity of liquid risk factors identified in step 1 may be too numerous for computational modeling purposes, a core set of liquid risk factors may be identified at step 2 by the computer system 20, executing the illiquid risk factor determination module 27. According to various embodiments, this may be done by principal component analysis (PCA). PCA could be used to identify, for example, ten (10) to one hundred (100), core liquid risk factors (the so-called "core set of risk factors"). This core set of liquid risk factors summarizes and represents the space of liquid risks.

Next, at step 3, a computer-implemented regression analysis may be performed on the non-liquid risk factor set of the universal risk factors on the core set of liquid risk factors. That is, each non-liquid time-series risk factor may be decomposed on its projection on the liquid space and an orthogonal (uncorrelated), illiquid component. According to various embodiments, the linear regression model may be based on the relation:

$$\vec{r}_i = \vec{L} \cdot \vec{\beta}_i + \vec{e}_i$$

where:

$\vec{r}_i$ is a (T×1) vector of daily changes on the non-liquid risk factor i and T is the number of days in the time series (e.g., 1040 days);

$\vec{L}$ is a matrix of dimensions (T×m) containing the m principal components of the space of liquid risks;

$\vec{\beta}_i$ is the (m×1) vector of sensitivities of risk factor $\vec{r}_i$ to each component of the core set; and $\vec{e}_i$ is the (T×1) matrix of residuals of factor $\vec{r}_i$ and is orthogonal (uncorrelated) to the space of liquid risks.

After estimating the regressions, each non-liquid VaR risk factor i is represented by its vector of regression residuals, $\vec{e}_i$. The regression analysis may be performed by the computer system 20, executing the illiquid risk factor determination module 27. The vector of regression residuals, $\vec{e}_i$, may be stored in the table 28 in the database 25.

Next, at step 4, a liquidity time horizon may be assigned to each residual vector $\vec{e}_i$ according to its liquidity in the marketplace. For example, each residual vector $\vec{e}_i$ could be assigned a liquidity horizon of 1 day, 5 days, 10 days, or 20 days. The assignment of the risk factors may be based on the measures of liquidity and the judgment of risk managers. The liquidity time horizons for each illiquid risk factor also may be stored in the table 28.

Once the vector of regression residuals and the associated liquidity time horizons have been determined, the computer system 20, executing the VaR calculation software module 26 may calculate the LA-VaR for the portfolio using the process described below. In order to calculate the LA-VaR, the total profits and loss (denoted "P&L") distribution for the portfolio may be calculated by the computer system 20 over a number of non-overlapping time intervals. For example, because VaR is typically calculated and reported for 1-, 5-, 10-, and 20-day time horizons, the non-overlapping intervals may be: [0, 1] day, (1, 5] days, (5, 10] days, and (10, 20] days. Accordingly, at step 5, the 1-day profits and losses (denoted "P&L") distribution for the portfolio is calculated by the computer system 20; that is, the P&L distribution for the interval [0, 1] is calculated. Any of the known or conventional techniques used in 1-day VaR calculations may be used to calculate the P&L distribution for the interval [0, 1], such as Monte Carlo or other types of simulations.

Next, at step 6, the P&L distributions for the portfolio for other time intervals, e.g., the (0, 5] interval, the (5, 10] interval, and the (10, 20] interval, are calculated by the computer system 20. The P&L distributions for these time intervals may be obtained by simulating only the VaR risk factors that have an assigned liquidity horizon equal to or greater than the right-end point of that interval. The liquidity time horizons for the risk factors may be stored in the table 28, as mentioned above. For example, a VaR risk factor that has been assigned a 5-day liquidity horizon may be used in calculating the P&L distribution for the interval (1, 5], but not the (5, 10] and (10, 20] intervals. Similarly, a VaR risk factor that has been assigned a 10-day liquidity horizon may be used in calculating the P&L distribution for the (1, 5] and (5, 10] intervals, but not the (10, 20] interval. Finally, a VaR risk factor that has been assigned a 20-day liquidity horizon may be used in calculating the P&L distribution for all of the intervals (1, 5], (5, 10] and (10, 20].

In calculating these P&L distributions, according to various embodiments, each residual series $\vec{e}_i$ is scaled by a multiplicative factor to reflect the length of the time interval. For example, when the P&L distribution for the interval (1, 5] is calculated, the $\vec{e}_i$'s that have liquidity horizons equal to or greater than 5 days may be multiplied by the factor $$\sqrt{\frac{(5-1)}{2}},$$

corresponding to the positive square root of the midpoint of the interval. Similarly, when the P&L distribution for the interval (5, 10] is calculated, the $\vec{e}_i$'s that have liquidity horizons equal to or greater than 10 days may be multiplied by the factor $$\sqrt{\frac{(10-5)}{2}}.$$

In addition, when the P&L distribution for the interval (10, 20] is calculated, the $\vec{e}_i$'s that have liquidity horizons equal to or greater than 10 days may be multiplied by the factor $$\sqrt{\frac{(20-10)}{2}}.$$

Figure 3:
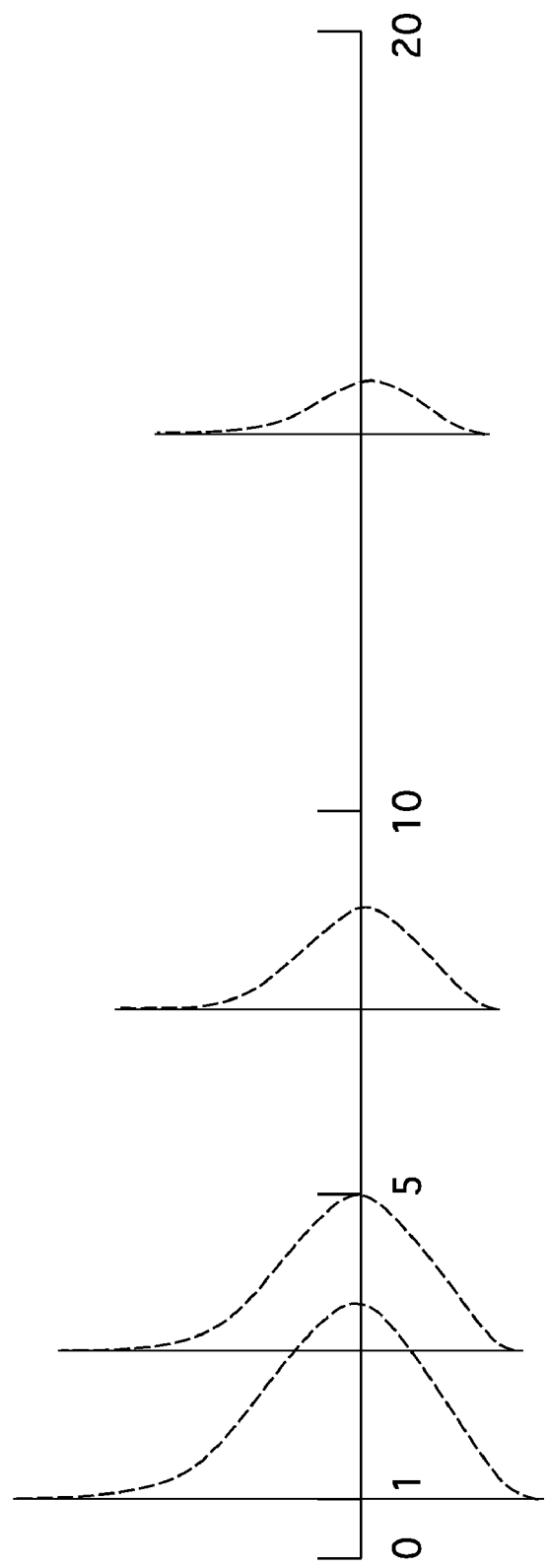
FIG. 3 illustrates sample P&L distributions for four different time intervals.

The result of these calculations is a number of P&L distributions, each corresponding to a different non-overlapping time interval. For example, the result may be four P&L distributions, corresponding to the time intervals [0, 1] day, (1, 5] days, (5, 10] days, and (10, 20] days, as represented graphically in FIG. 3.

Figure 4:
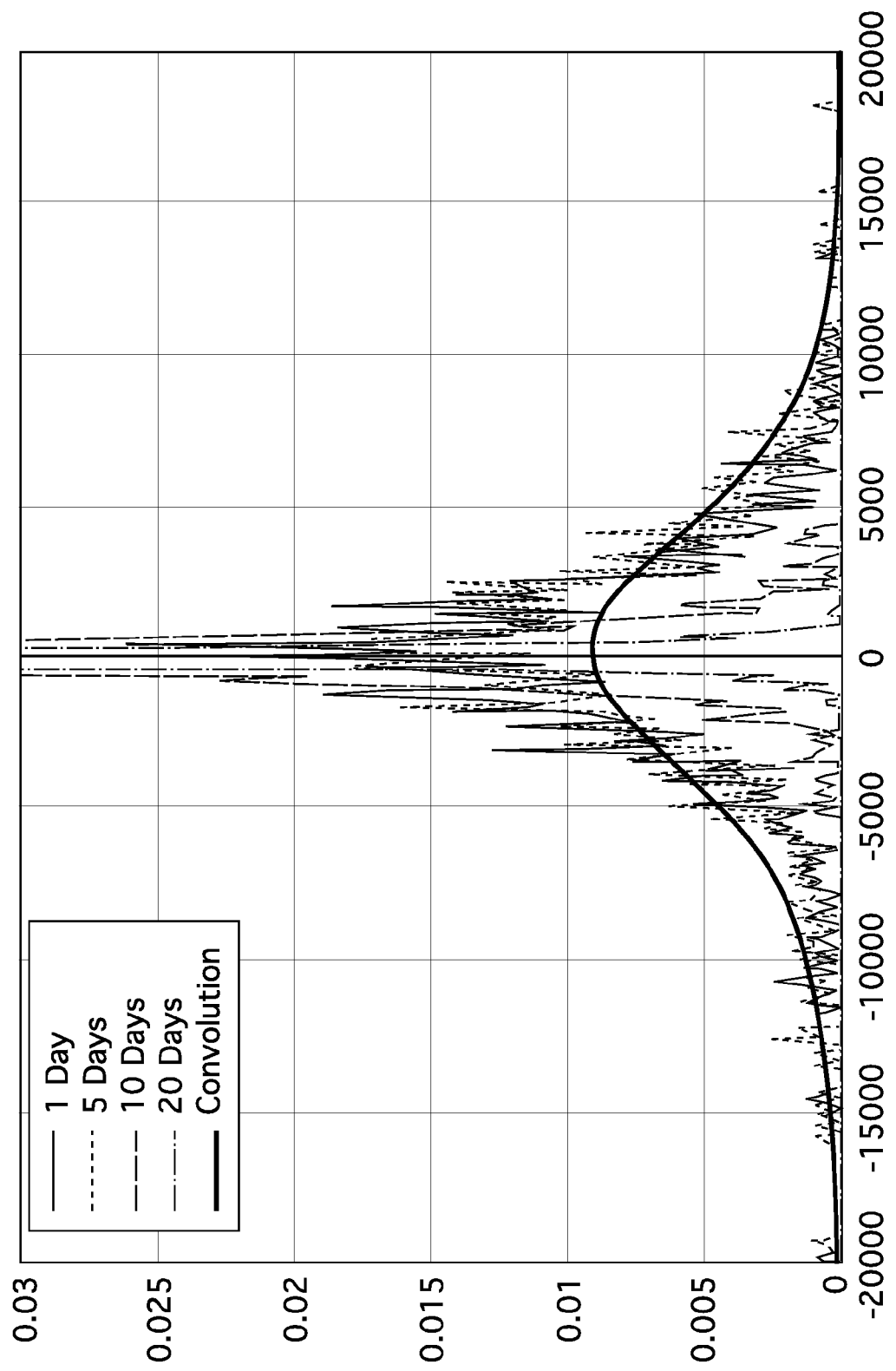
FIG. 4 illustrates the convolution of four P&L distributions.

Next, at step 7, the P&L distributions are combined mathematically by the computer system 20 to obtain the total P&L distribution over the full time evaluation horizon (e.g., the full 20-day horizon). According to various embodiments, the convolution of the P&L distributions may be calculated for the combination. Preferably, the independence of the P&L distributions could be assumed, but this is not necessary. Any suitable technique for calculating the convolution of the P&L distributions may be used, such as a fast Fourier transform algorithm. FIG. 4 graphically depicts a convolution of four P&L distributions corresponding to the intervals [0, 1] day, (1, 5] days, (5, 10] days, and (10, 20] days. The solid smooth curve 40 represents the convolution of the four P&L distributions.

Once the P&L distributions have been combined, at step 8 the desired risk measures may be calculated by the computer system 20 using the combined P&L distribution. The calculated risk measures may include 95% and 99% confidence levels for the 20-day VaR. Known techniques for calculating VaR once the P&L distribution is obtained may be used. See, e.g., William Fallon, "Calculating Value-at-Risk," WFI Center, Wharton School (1996), and John C. Hull, *Options, Futures, and Other Derivatives*, Prentice Hall, 6$^{th}$ ed., Chap 18, "Value At Risk," 2006, both of which are incorporated herein. Other risk measures could also be calculated from the P&L distribution, including conditional VaR, etc.

To calculate the 10-day LA-VaR according to this technique, only the P&L distributions for the intervals [0, 1] day, (1, 5] days, (5, 10] days need to be combined (e.g., convolved). Similarly, to calculate the 5-day LA-VaR according to this technique, only the P&L distributions for the intervals [0, 1] day and (1, 5] days need to be combined.

FIG. 5 presents results from a sample LA-VaR calculation. In this example, there were two (2) risk factors with a liquidity horizon of twenty (20) days, forty-one (41) risk factors with a liquidity horizon of ten (10) days, one hundred fifteen (115) risk factors with a liquidity horizon of five (5) days, and three hundred seventy (370) risk factors with a liquidity horizon of one (1) day. The bar graph in FIG. 5 illustrates the VaR for each time interval, and the dashed line illustrates the combined LA-VaR (e.g., resulting from the convolution of the P&L distributions).

As can be seen, the embodiment of the process described above distinguishes between the liquidity of risks and the liquidity of the financial instruments. The relevant economic attribute is the liquidity of risks. Illiquid instruments can be hedged, at least partially, to the extent they contain liquid, hedgeable risks. For example, suppose that 70% of the risk of a private equities portfolio is hedgeable with a liquid index of small cap stocks. Then, the illiquid portion of the risk is only 30% of the total risk. As another example, consider an illiquid corporate bond that can be 80% hedged with a combination of interest rate swaps and corporate bond indices. Then, the illiquid portion is only 20% of the total risk.

In variations on the above-described process for calculating the LA-VaR, various liquid sets may be defined successively, each one containing all risk factors with liquidity horizons less than t. For example, when calculating the P&L distribution for the interval (5, 10] days, the liquid set may be redefined as the original liquid set (e.g., risk factors with a liquidity horizon of 1 day) plus all the $\vec{e}_i$'s that have a liquidity horizon equal to five days. Similarly, when calculating the P&L distribution for the interval (10, 20] days, the liquid set may be redefined as the original liquid set (e.g., risk factors with a liquidity horizon of 1 day) plus all the $\vec{e}_i$'s that have a liquidity horizon equal to five or ten days. This variant is more computationally intensive because it requires the estimation of principal components and successive sets of $\vec{e}_i$'s. The underlying economic intuition is that all risk factors with liquidity horizons shorter than t should be considered available for hedging when evaluating risks and losses at horizons greater than t.

Although the processes presented herein have generally described calculating the 1, 5, 10, and 20 day LA-VaR, it should be recognized that the processes presented herein could be used to calculate the LA-VaR for different time horizons. The 1, 5, 10, and 20 day VaR are the most commonly used and reported VaR values. Also, although the computer system 20 was previously described as calculating the LA-VaR for a single portfolio, the computer system 20 could obviously be used to calculate the LA-VaR for a number of portfolios. Data 33 regarding the various portfolios may be stored in the database 25.

The examples presented herein are intended to illustrate potential and specific implementations of the embodiments. It can be appreciated that the examples are intended primarily for purposes of illustration for those skilled in the art. No particular aspect or aspects of the examples is/are intended to limit the scope of the described embodiments. The figures and descriptions of the embodiments have been simplified to illustrate elements that are relevant for a clear understanding of the embodiments, while eliminating, for purposes of clarity, other elements.

According to various embodiments, therefore, the present invention is directed to a computer-implemented method for calculating an $x_n$-day liquidity-adjusted value-at-risk (LA-VaR) measure for a financial portfolio. The method may comprise the steps of: (i) determining, from an initial set of market risk factors for the portfolio, a core set of liquid risk factors for the portfolio, wherein the core set of liquid risk factors represents a space of liquid risks for the portfolio; (ii) determining a subset of illiquid risk factors from the initial set of risk factors via a linear regression of each illiquid risk factor on the space of liquid risks as represented by the core set of liquid risk factors; (iii) storing in a computer database a liquidity time horizon for each illiquid risk factor; (iv) calculating a profit and loss (P&L) distribution for the portfolio for a time interval [0,1 day]; (v) calculating one or more P&L distributions for the portfolio for the time intervals ($x_{i-1}, x_i$ day], wherein $x_i > 1$ day by simulating only the illiquid risk factors having a liquidity time horizon greater than or equal to $x_i$ days, where $x_{i-1} = 1$ day, where i=1, ... n, and where n≧1; combining the P&L distributions for the [0,1 day] time interval and the one or more ($x_{i-1}, x_i$ day] time intervals; and calculating the $x_n$-day VaR for the portfolio based on the combined P&L distributions.

According to various implementations, the core set of liquid risk factors for the portfolio comprises are determined using principal component analysis. In addition, the step of combining the P&L distributions for the [0,1 day] time interval and the one or more ($x_{i-1}, x_i$ day] time intervals may comprise convolving the P&L distributions for the [0,1 day] time interval and the one or more ($x_{i-1}, x_i$ day] time intervals. In addition, according to various embodiments: (i) the step of calculating the one or more P&L distributions for the portfolio comprises calculating P&L distributions for the time intervals (1,5 days], (5,10 days], and (10,20 days]; (ii) the step of combining the P&L distributions for the [0,1 day] time interval and the one or more ($x_{i-1}, x_i$ day] time intervals comprises convolving the P&L distributions for the [0,1 day] time interval, the (1, 5 day] time interval, the (5, 10 day] time interval, and the (10, 20 day] time interval; and (iii) the step of calculating the $x_n$-day LA-VaR comprises calculating the 5-day LA-VaR, the 10-day LA-VaR, and the 20-day LA-VaR based on the convolved P&L distributions for the [0,1 day] time interval, the (1, 5 day] time interval, the (5, 10 day] time interval, and the (10, 20 day] time interval.

Various implementations of the present invention also are directed to a computer-based system for calculating an $x_n$-day liquidity-adjusted value-at-risk (LA-VaR) measure for a financial portfolio. The system may comprise a computer database and a computer device in communication with the computer database. The computer device may comprise at least one processor circuit and at least one memory circuit. In addition, the computer device may be programmed to: (i) determine, from an initial set of market risk factors for the portfolio, a core set of liquid risk factors for the portfolio, wherein the core set of liquid risk factors represents a space of liquid risks for the portfolio; (ii) determine a subset of illiquid risk factors from the initial set of risk factors via a linear regression of each illiquid risk factor on the space of liquid risks as represented by the core set of liquid risk factors, wherein a liquidity time horizon for each illiquid risk factor is stored in the computer database; (iii) calculate a profit and loss (P&L) distribution for the portfolio for a time interval [0,1 day]; (iv) calculate one or more P&L distributions for the portfolio for the time intervals ($x_{i-1}, x_i$ day], wherein $x_i$>1 day by simulating only the illiquid risk factors having a liquidity time horizon greater than or equal to $x_i$ days, where $x_{i-1}=1$ day, where i=1, . . . n, and where n≧1; (v) combine the P&L distributions for the [0,1 day] time interval and the one or more ($x_{i-1}, x_i$ day] time intervals; and (vi) calculate the $x_n$-day VaR for the portfolio based on the combined P&L distributions.

In addition, various embodiments of the present invention are directed to a computer readable medium having stored thereon instructions that when executed by a processor circuit cause the processor circuit to calculate an $x_n$-day liquidity-adjusted value-at-risk (LA-VaR) measure for a financial portfolio by: (i) determining, from an initial set of market risk factors for the portfolio, a core set of liquid risk factors for the portfolio, wherein the core set of liquid risk factors represents a space of liquid risks for the portfolio; (ii) determining a subset of illiquid risk factors from the initial set of risk factors via a linear regression of each illiquid risk factor on the space of liquid risks as represented by the core set of liquid risk factors; (iii) calculating a profit and loss (P&L) distribution for the portfolio for a time interval [0,1 day]; (iv) calculating one or more P&L distributions for the portfolio for the time intervals ($x_{i-1}, x_i$ day], wherein $x_i$>1 day by simulating only the illiquid risk factors having a liquidity time horizon greater than or equal to x, days, where $x_{i-1}=1$ day, where i=1, . . . n, and where n≧1; (v) combining the P&L distributions for the [0,1 day] time interval and the one or more ($x_{i-1}, x_i$ day] time intervals; and (vi) calculating the $x_n$-day VaR for the portfolio based on the combined P&L distributions.

In general, it will be apparent to one of ordinary skill in the art that at least some of the embodiments described herein may be implemented in many different embodiments of software, firmware, and/or hardware. The software and firmware code may be executed by a processor or any other similar computing device. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semipermanent, and/or semitemporary.

A "computer," "computer system," "host," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm" or other grouping of networked servers (such as server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computer-implemented method for calculating an $x_n$-day liquidity-adjusted value-at-risk (LA-VaR) measure for a financial portfolio, the method comprising:
   determining, by a computer system, from an initial set of market risk factors for the portfolio, a core set of liquid risk factors for the portfolio, wherein the core set of liquid risk factors represents a space of liquid risks for the portfolio;
   determining, by the computer system, a subset of illiquid risk factors from the initial set of risk factors via a linear regression of each illiquid risk factor on the space of liquid risks as represented by the core set of liquid risk factors;
   storing, by the computer system, a liquidity time horizon for each illiquid risk factor;
   calculating by the computer system a profit and loss (P&L) distribution for the portfolio for a time interval [0,1 day];
   calculating by the computer system one or more P&L distributions for the portfolio for the time intervals day], wherein $x_i$>1 day by simulating only the illiquid risk factors having a liquidity time horizon greater than or equal to $x_n$-days, where $x_{i-1}$=1 day, where i=1, ... n, and where n≧1;
   combining by the computer system the P&L distributions for the [0,1] time interval and the one or more ($x_{i-1}$,$x_i$ day] time intervals; and
   calculating by the computer system the $x_n$-day VaR for the portfolio based on the combined P&L distributions,
   wherein the computer system comprises at least one computer device, wherein the computer device comprises at least one processor circuit and at least one memory circuit.

2. The method of claim 1, wherein the step of determining the core set of liquid risk factors for the portfolio comprises using principal component analysis to determine the core set of liquid risks.

3. The method of claim 1, wherein the step of combining the P&L distributions for the [0,1 day] time interval and the one or more ($x_{i-1}$,$x_i$ day] time intervals comprises convolving the P&L distributions for the [0,1 day] time interval and the one or more ($x_{i-1}$,$x_i$ day] time intervals.

4. The method of claim 1, wherein:
   the step of calculating the one or more P&L distributions for the portfolio comprises
   calculating P&L distributions for the time intervals (1,5 days], (5,10 days], and (10,20 days];
   the step of combining the P&L distributions for the [0,1 day] time interval and the one or more ($x_{i-1}$,$x_i$ day] time intervals comprises convolving the P&L distributions for the [0,1 day] time interval, the (1, 5 day] time interval, the (5, 10 day] time interval, and the (10, 20 day] time interval; and
   the step of calculating the $x_n$-day LA-VaR comprises calculating the 5-day LA-VaR, the 10-day LA-VaR, and the 20-day LA-VaR based on the convolved P&L distributions for the [0,1 day] time interval, the (1, 5 day] time interval, the (5, 10 day] time interval, and the (10, 20 day] time interval.

5. The method of claim 4, wherein the step of calculating the one or more P&L distributions for the portfolio comprises scaling the illiquid risk factors by a multiplicative factor to reflect the length of the time interval.

6. The method of claim 5, wherein the step of scaling the illiquid risk factors by a multiplicative factor comprises:
   scaling a illiquid risk factor having liquidity time horizon equal to or greater than five days by $\sqrt{2}$ when calculating the P&L distribution for the (1, 5 day] time interval;
   scaling a illiquid risk factor having liquidity time horizon equal to or greater than five days by $\sqrt{5/2}$ when calculating the P&L distribution for the (5, 10 day] time interval; and
   scaling a illiquid risk factor having liquidity time horizon equal to or greater than five days by $\sqrt{5}$ when calculating the P&L distribution for the (10, 20 day] time interval.

7. The method of claim 1, wherein the step of determining the subset of illiquid risk factors from the initial set of risk factors via a linear regression of each illiquid risk factor on the space of liquid risks as represented by the core set of liquid risk factors comprises modeling the linear regression based on the relation:

$$\vec{r}_i = \vec{L} \cdot \vec{\beta}_i + \vec{e}_i$$

where:
   $\vec{r}_i$ is a (T×1) vector of daily changes on the non-liquid risk factor i and T is a number of days in a time series;
   $\vec{L}$ is a matrix of dimensions (T×m) containing the m principal components of the space of liquid risks;
   $\vec{\beta}_i$ is the (m×1) vector of sensitivities of risk factor $\vec{r}_i$ to each component of the core set of liquid risk factors; and
   $\vec{e}_i$ is the (T×1) matrix of residuals of factor $\vec{r}_i$ and is orthogonal to the space of liquid risks.

8. A system for calculating an $x_n$-day liquidity-adjusted value-at-risk (LA-VaR) measure for a financial portfolio, the system comprising:
   a computer data store; and
   a computer device in communication with the computer data store, wherein the computer device comprises at least one processor circuit and at least one memory circuit, and wherein the computer device is programmed to:
   determine, from an initial set of market risk factors for the portfolio, a core set of liquid risk factors for the portfolio, wherein the core set of liquid risk factors represents a space of liquid risks for the portfolio;
   determine a subset of illiquid risk factors from the initial set of risk factors via a linear regression of each illiquid risk factor on the space of liquid risks as represented by the core set of liquid risk factors, wherein a liquidity time horizon for each illiquid risk factor is stored in the computer data store;

calculate a profit and loss (P&L) distribution for the portfolio for a time interval [0,1 day];

calculate one or more P&L distributions for the portfolio for the time intervals $(x_{i-1}, x_i$ day], wherein $x_i > 1$ day by simulating only the illiquid risk factors having a liquidity time horizon greater than or equal to $x_i$ days, where $x_{i-1} = 1$ day, where $i = 1, \ldots n$, and where $n \geq 1$;

combine the P&L distributions for the [0,1 day] time interval and the one or more $(x_{i-1}, x_i$ day] time intervals; and calculate the $x_n$-day VaR for the portfolio based on the combined P&L distributions.

9. The system of claim 8, wherein the computer device is programmed to determine the core set of liquid risk factors for the portfolio using principal component analysis.

10. The system of claim 8, wherein the computer device is programmed to combine the P&L distributions for the [0,1 day] time interval and the one or more $(x_{i-1}, x_i$ day] time intervals by convolving the P&L distributions for the [0,1 day] time interval and the one or more $(x_{i-1}, x_i$ day] time intervals.

11. The system of claim 8, wherein the computer device is programmed to:

calculate the one or more P&L distributions for the portfolio by calculating P&L distributions for the time intervals (1,5 days], (5,10 days], and (10,20 days];

combine the P&L distributions for the [0,1 day] time interval and the one or more $(x_{i-1}, x_i$ day] time intervals by convolving the P&L distributions for the [0,1 day] time interval, the (1, 5 day] time interval, the (5, 10 day] time interval, and the (10, 20 day] time interval; and calculate the $x_n$-day LA-VaR by calculating the 5-day LA-VaR, the 10-day LA-VaR, and the 20-day LA-VaR based on the convolved P&L distributions for the [0,1 day] time interval, the (1, 5 day] time interval, the (5, 10 day] time interval, and the (10, 20 day] time interval.

12. The system of claim 11, wherein the computer device is programmed to calculate the one or more P&L distributions for the portfolio by scaling the illiquid risk factors by a multiplicative factor to reflect the length of the time interval.

13. The system of claim 12, wherein the computer device is programmed to scale the illiquid risk factors by a multiplicative factor by:

scaling a illiquid risk factor having liquidity time horizon equal to or greater than five days by $\sqrt{2}$ when calculating the P&L distribution for the (1, 5 day] time interval;

scaling a illiquid risk factor having liquidity time horizon equal to or greater than five days by $\sqrt{5/2}$ when calculating the P&L distribution for the (5, 10 day] time interval; and scaling a illiquid risk factor having liquidity time horizon equal to or greater than five days by $\sqrt{5}$ when calculating the P&L distribution for the (10, 20 day] time interval.

14. The system of claim 8, wherein the computer device is programmed to determine the subset of illiquid risk factors from the initial set of risk factors via a linear regression of each illiquid risk factor on the space of liquid risks as represented by the core set of liquid risk factors by modeling the linear regression based on the relation:

$$\vec{r}_i = \vec{L} \cdot \vec{\beta}_i + \vec{e}_i$$

where:

$\vec{r}_i$ is a (T×1) vector of daily changes on the non-liquid risk factor i and T is a number of days in a time series;

$\vec{L}$ is a matrix of dimensions (T×m) containing the m principal components of the space of liquid risks;

$\vec{\beta}_i$ is the (m×1) vector of sensitivities of risk factor $\vec{r}_i$ to each component of the core set of liquid risk factors; and $\vec{e}_i$ is the (T×1) matrix of residuals of factor $\vec{r}_i$ and is orthogonal to the space of liquid risks.

15. A non-transitory storage medium having stored thereon instructions that when executed by a processor circuit cause the processor circuit to calculate an $x_n$-day liquidity-adjusted value-at-risk (LA-VaR) measure for a financial portfolio by:

determining, from an initial set of market risk factors for the portfolio, a core set of liquid risk factors for the portfolio, wherein the core set of liquid risk factors represents a space of liquid risks for the portfolio;

determining a subset of illiquid risk factors from the initial set of risk factors via a linear regression of each illiquid risk factor on the space of liquid risks as represented by the core set of liquid risk factors;

calculating a profit and loss (P&L) distribution for the portfolio for a time interval [0,1 day];

calculating one or more P&L distributions for the portfolio for the time intervals $(x_{i-1}, x_i$ day], wherein $x_i > 1$ day by simulating only the illiquid risk factors having a liquidity time horizon greater than or equal to $x_i$ days, where $x_{i-1} = 1$ day, where $i = 1, \ldots n$, and where $n \geq 1$;

combining the P&L distributions for the [0,1 day] time interval and the one or more $(x_{i-1}, x_i$ day] time intervals; and calculating the $x_n$-day VaR for the portfolio based on the combined P&L distributions.

16. The non-transitory storage medium of claim 15, wherein the computer readable medium has instructions stored thereon which when executed by the processor circuit causes the processor circuit to determine the core set of liquid risk factors for the portfolio using principal component analysis.

17. The non-transitory storage medium of claim 15, wherein the computer readable medium has instructions stored thereon which when executed by the processor circuit causes the processor circuit to combine the P&L distributions for the [0,1 day] time interval and the one or more $(x_{i-1}, x_i]$ time intervals by convolving the P&L distributions for the [0,1 day] time interval and the one or more $(x_{i-1}, x_i]$ time intervals.

18. The non-transitory storage medium of claim 15, wherein the computer readable medium has instructions stored thereon which when executed by the processor circuit causes the processor circuit to:

calculate the one or more P&L distributions for the portfolio by calculating P&L distributions for the time intervals (1,5 days], (5,10 days], and (10,20 days];

combine the P&L distributions for the [0,1 day] time interval and the one or more $(x_{i-1}, x_i$ day] time intervals by convolving the P&L distributions for the [0,1 day] time interval, the (1, 5 day] time interval, the (5, 10 day] time interval, and the (10, 20 day] time interval; and calculate the $x_n$-day LA-VaR by calculating the 5-day LA-VaR, the 10-day LA-VaR, and the 20-day LA-VaR based on the convolved P&L distributions for the [0,1 day] time interval, the (1, 5 day] time interval, the (5, 10 day] time interval, and the (10, 20 day] time interval.

19. The non-transitory storage medium of claim 18, wherein the computer readable medium has instructions stored thereon which when executed by the processor circuit causes the processor circuit to calculate the one or more P&L distributions for the portfolio by scaling the illiquid risk factors by a multiplicative factor to reflect the length of the time interval.

20. The non-transitory storage medium of claim 19, wherein the computer readable medium has instructions stored thereon which when executed by the processor circuit causes the processor circuit to scale the illiquid risk factors by a multiplicative factor by:
   scaling a illiquid risk factor having liquidity time horizon equal to or greater than five days by $\sqrt{2}$ when calculating the P&L distribution for the (1, 5 day] time interval;
   scaling a illiquid risk factor having liquidity time horizon equal to or greater than five days by $\sqrt{5/2}$ when calculating the P&L distribution for the (5, 10 day] time interval; and
   scaling a illiquid risk factor having liquidity time horizon equal to or greater than five days by $\sqrt{5}$ when calculating the P&L distribution for the (10, 20 day] time interval.

21. The non-transitory storage medium of claim 15, wherein the computer readable medium has instructions stored thereon which when executed by the processor circuit causes the processor circuit to determine the subset of illiquid risk factors from the initial set of risk factors via a linear regression of each illiquid risk factor on the space of liquid risks as represented by the core set of liquid risk factors by modeling the linear regression based on the relation:

$$\vec{r}_i = \vec{L} \cdot \vec{\beta}_i + \vec{e}_i$$

where:
   $\vec{r}_i$ is a (T×1) vector of daily changes on the non-liquid risk factor i and T is a number of days in a time series;
   $\vec{L}$ is a matrix of dimensions (T×m) containing the m principal components of the space of liquid risks;
   $\vec{\beta}_i$ is the (m×1) vector of sensitivities of risk factor $\vec{r}_i$ to each component of the core set of liquid risk factors; and
   $\vec{e}_i$ is the (T×1) matrix of residuals of factor $\vec{r}_i$ and is orthogonal to the space of liquid risks.

22. A computer-implemented method for calculating a liquidity-adjusted value-at-risk (LA-VaR) measure for a financial portfolio for a n-day VaR calculation period, the method comprising:
   where the n-day VaR calculation period has a number m of sub-time intervals indexed by k=1, . . . , m, each sub-time interval k having a start time $t_{k-1}$ and an end time $t_k$, and $t_0=0$,
   (a) determining, by a computer system, a core set of liquid risk factors available in a first sub-time interval $[t_0, t_1]$, wherein the liquid risk factors available in the first sub-time interval are risk factors that have liquidity horizons less than or equal to the end time $t_1$ of the first sub-time interval and represent a space of liquid risks for the portfolio for the first sub-time interval, wherein risk factors with liquidity horizons greater than the end time $t_1$ of the first sub-time interval are illiquid risk factors in the first sub-time interval;
   (b) extracting, by the computer system, liquid risk components of the illiquid risk factors in the first sub-time interval $[t_0, t_1]$ via linear regression of each illiquid risk factor on the core set of liquid risk factor in the first sub-time interval, wherein residuals of the linear regression represent the illiquid risk factors in the first sub-time interval after extraction of the liquid risk components of the illiquid risk factors;
   (c) calculating, by the computer system, a profit and loss (P&L) distribution for the portfolio for the first sub-time interval $[t_0, t_1]$ based on the residuals and the liquid risk factors for the first sub-time interval;
   (d) repeating steps (a)-(c) for sub-time intervals indexed by k=2, . . . , m;
   (e) computing, by the computer system, a combined P&L distribution for the portfolio by combining the P&L distributions for each of the sub-time intervals indexed by k=1, . . . , m; and
   (f) calculating, by the computer system, the VaR for the portfolio for the n-day VaR calculation period based on the combined P&L distribution.

23. The method of claim 22, wherein calculating the combined P&L distribution comprises convolving the P&L distributions calculated for k=1, . . . , m.

24. A system for calculating a liquidity-adjusted value-at-risk (LA-VaR) measure for a financial portfolio for a n-day VaR calculation period, the system comprising:
   at least one computer device that comprises at least one processor circuit and at least one memory circuit, and wherein the at least one computer device is programmed to:
   where the n-day VaR calculation period has a number m of sub-time intervals indexed by k=1, . . . , m, each sub-time interval k having a start time $t_{k-1}$, and an end time $t_k$, and $t_0=0$,
   (a) determine a core set of liquid risk factors available in a first sub-time interval $[t_0, t_1]$, wherein the liquid risk factors available in the first sub-time interval are risk factors that have liquidity horizons less than or equal to the end time $t_1$ of the first sub-time interval and represent a space of liquid risks for the portfolio for the first sub-time interval, wherein risk factors with liquidity horizons greater than the end time $t_1$ of the first sub-time interval are illiquid risk factors in the first sub-time interval;
   (b) extract liquid risk components of the illiquid risk factors in the first sub-time interval $[t_0, t_1]$ via linear regression of each illiquid risk factor on the core set of liquid risk factor in the first sub-time interval, wherein residuals of the linear regression represent the illiquid risk factors in the first sub-time interval after extraction of the liquid risk components of the illiquid risk factors;
   (c) calculate a profit and loss (P&L) distribution for the portfolio for the first sub-time interval $[t_0, t_1]$ based on the residuals and the liquid risk factors for the first sub-time interval;
   (d) repeat steps (a)-(c) for sub-time intervals indexed by k=2, . . . , m;
   (e) compute a combined P&L distribution for the portfolio by combining the P&L distributions for each of the sub-time intervals indexed by k=1, . . . , m; and
   (f) calculate the VaR for the portfolio for the n-day VaR calculation period based on the combined P&L distribution.

25. The system of claim 24, wherein calculating the combined P&L distribution comprises convolving the P&L distributions calculated for k=1, . . . , m.

26. A non-transitory storage medium having stored thereon instructions that when executed by a processor circuit cause the processor circuit to calculate a liquidity-adjusted value-at-risk (LA-VaR) measure for a financial portfolio for a n-day VaR calculation period by:

where the n-day VaR calculation period has a number m of sub-time intervals indexed by k=1, ..., m, each sub-time interval k having a start time $t_{k-1}$ and an end time $t_k$, and $t_0=0$, (a) determining a core set of liquid risk factors available in a first sub-time interval $[t_0, t_1]$, wherein the liquid risk factors available in the first sub-time interval are risk factors that have liquidity horizons less than or equal to the end time $t_1$ of the first sub-time interval and represent a space of liquid risks for the portfolio for the first sub-time interval, wherein risk factors with liquidity horizons greater than the end time $t_1$ of the first sub-time interval are illiquid risk factors in the first sub-time interval;

(b) extracting liquid risk components of the illiquid risk factors in the first sub-time interval $[t_0, t_1]$ via linear regression of each illiquid risk factor on the core set of liquid risk factor in the first sub-time interval, wherein residuals of the linear regression represent the illiquid risk factors in the first sub-time interval after extraction of the liquid risk components of the illiquid risk factors;

(c) calculating a profit and loss (P&L) distribution for the portfolio for the first sub-time interval $[t_0, t_1]$ based on the residuals and the liquid risk factors for the first sub-time interval;

(d) repeating steps (a)-(c) for sub-time intervals indexed by k=2, ..., m;

(e) computing a combined P&L distribution for the portfolio by combining the P&L distributions for each of the sub-time intervals indexed by k=1, ..., m; and (f) calculating the VaR for the portfolio for the n-day VaR calculation period based on the combined P&L distribution.

27. The non-transitory storage medium of claim 26, wherein the computer readable medium has instructions stored thereon which when executed by the processor circuit causes the processor circuit to compute the combined P&L distribution by convolving the P&L distributions calculated for k=1, ..., m.

* * * * *

UNITED STATES PATENT AND TRADEMARK OFFICE
CERTIFICATE OF CORRECTION

PATENT NO. : 8,234,201 B1  
APPLICATION NO. : 12/408240  
DATED : July 31, 2012  
INVENTOR(S) : E. Canabarro Page 1 of 1

It is certified that error appears in the above-identified patent and that said Letters Patent is hereby corrected as shown below:

IN THE CLAIMS

COL. 9, LINE 44

Delete "time intervals day],", and substitute therefore --time intervals $(x_{i-1}, x_i$ day],--.

COL. 9, LINE 47

Delete "equal to $x_n$ –days, where", and substitute therefore --equal to $x_i$ days, where--.

COL. 11, LINE 10

Delete "greater than or equal to x, days, where", and substitute therefore --greater than or equal to $x_i$ days, where--.

Signed and Sealed this  
Thirteenth Day of August, 2013

Teresa Stanek Rea  
*Acting Director of the United States Patent and Trademark Office*